No. 757,426. PATENTED APR. 12, 1904.
J. NOEY & T. A. McGUIGGAN.
APPARATUS FOR FEEDING NEUTRALIZING AGENTS TO STEAM BOILERS.
APPLICATION FILED FEB. 10, 1904.
NO MODEL. 2 SHEETS—SHEET 1.
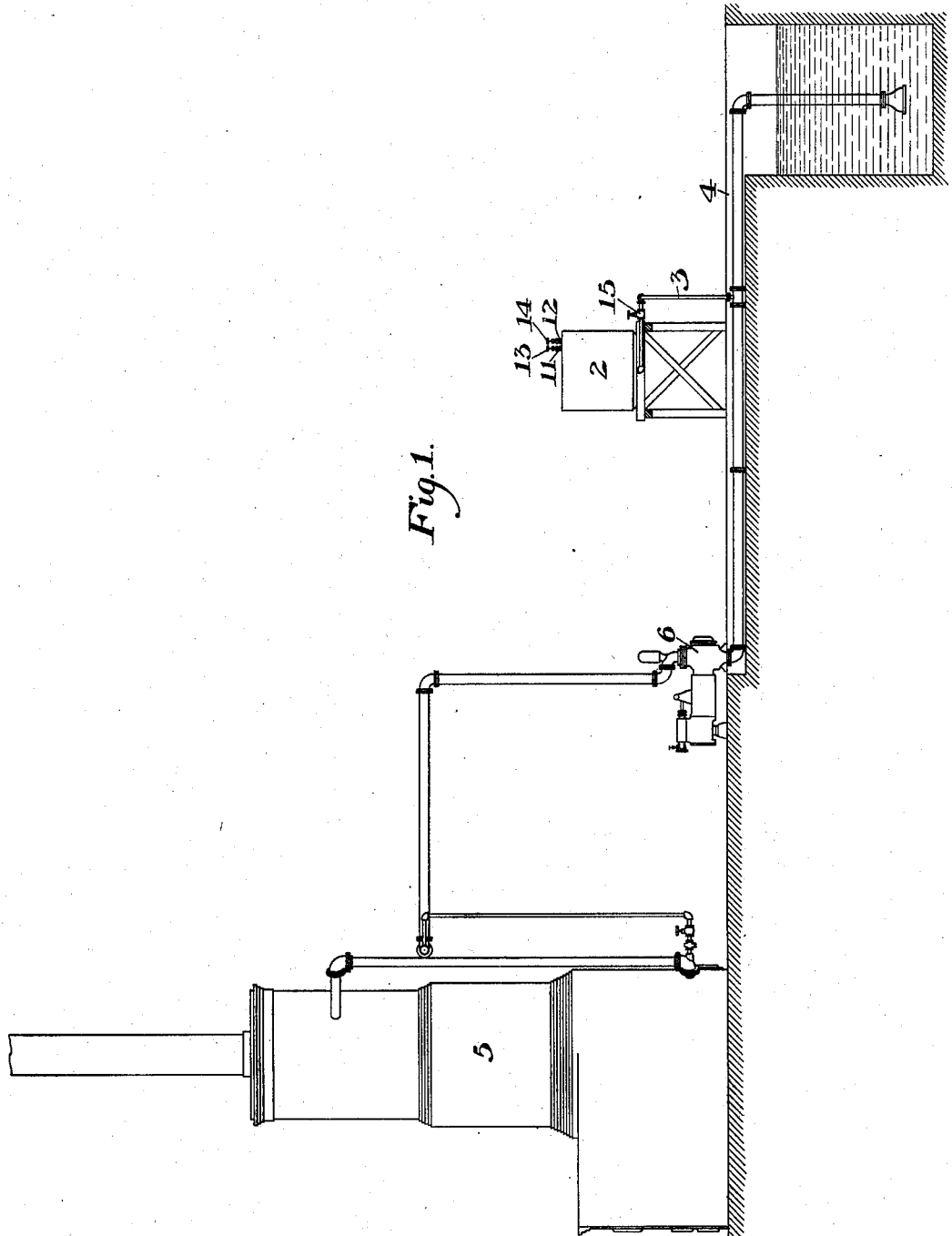

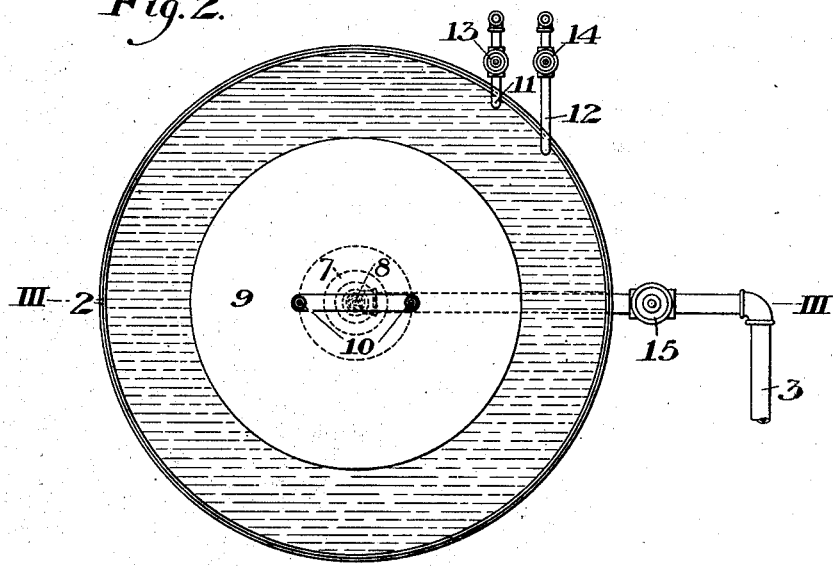
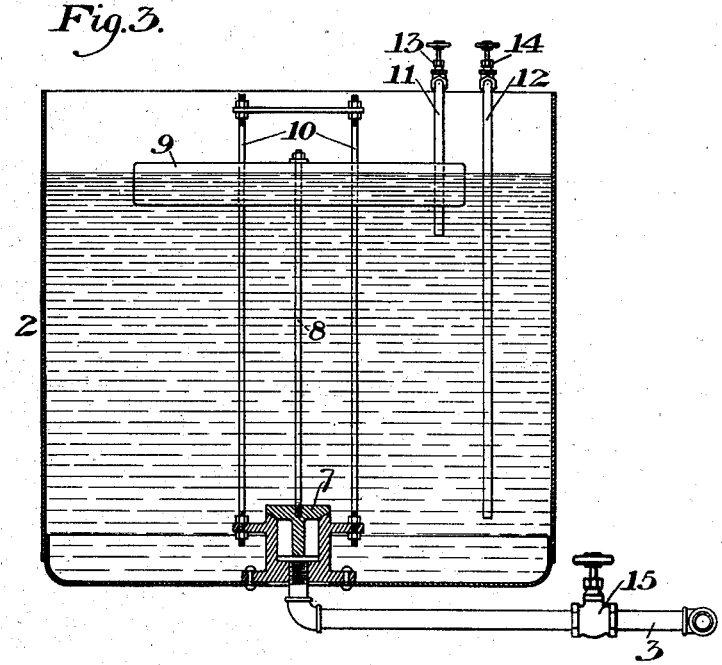

No. 757,426. Patented April 12, 1904.

UNITED STATES PATENT OFFICE.

JOHN NOEY, OF BRADDOCK, AND THOMAS A. McGUIGGAN, OF BRINTON, PENNSYLVANIA.

APPARATUS FOR FEEDING NEUTRALIZING AGENTS TO STEAM-BOILERS.

SPECIFICATION forming part of Letters Patent No. 757,426, dated April 12, 1904.

Application filed February 10, 1904. Serial No. 192,890. (No model.)

*To all whom it may concern:*

Be it known that we, JOHN NOEY, of Braddock, and THOMAS A. McGUIGGAN, of Brinton, Allegheny county, Pennsylvania, have invented a new and useful Apparatus for Feeding Neutralizing Agents to Steam - Boilers, of which the following is a full, clear, and exact description, reference being had to the accompanying drawings, forming part of this specification, in which—

Figure 1 is a side elevation of a boiler plant equipped with our improved apparatus. Fig. 2 is a plan view of the mixing-tank, and Fig. 3 is a vertical section on the line III III of Fig. 2.

The object of our invention is to overcome the disadvantages in the apparatus heretofore used in supplying the neutralizing agent to the boilers of a steam plant and to provide means for maintaining a regular and constant supply of the neutralizing agent, to keep the solution thoroughly mixed in the supply-tank, and to prevent the draining of the supply-tank while it is in use.

In steam-boiler plants it is usually necessary to treat the boiler feed-water with soda-ash or other alkaline materials to neutralize the acids or other objectionable material contained in the feed-water to overcome the bad effect of such foreign materials and to prevent the excessive formation of scale in the steam-boilers. Heretofore the neutralizing agent has been supplied to the boilers by mixing a quantity of soda-ash or other neutralizing agent with water in a suitable tank with a discharge-pipe connecting the tank with the main feed-pipe connecting the tank with the main feed-water-supply line to the boilers. The feed-pump being located at a point on the feed-water line between the mixing-tank and boiler would draw a portion of the solution into the main feed-water line, together with a much larger quantity of boiler feed-water from the main feed-water supply. There being nothing to regulate the flow of the solution from the tank, an excessive amount of the solution would be apt to be delivered at one time and an insufficient amount at another time, while if not closely watched the tank would be emptied and air would be drawn into the feed line and pump, causing the pump to run at an excessive speed and in this manner cause great danger of breaking the pump. By the use of our improved apparatus all this is avoided, the materials in the tank are kept thoroughly mixed, and a constant amount of the solution is supplied at regular intervals to the boilers, while the possibility of the admission of air to the feed-line and feed-pump and consequent damaging of the pump is avoided.

In the drawings, 2 is a mixing-tank connected by a suitable discharge-pipe 3 with the main feed-line 4 to the boiler 5 and having a feed-pump 6 located in the feed-line at a point between the tank and boiler. In the tank is a regulating-valve 7, with a valve-rod 8, having loosely attached to its outer end a float 9. Suitable guide-rods 10 serve to keep the float and valve in the proper position over the valve-seat.

11 is a water-supply pipe to the mixing-tank, and 12 a pipe to supply steam to the tank for the purpose of agitating the solution and keeping it thoroughly mixed. The valves 13 and 14 regulate the supply of water and steam to the tank, and the auxiliary valve 15 regulates the flow of the solution from the tank.

The operation of our improved apparatus is as follows: A suitable amount of soda-ash or other neutralizing agent is placed in the mixing-tank and the tank is filled with water from the water-supply pipe to the tank. The solution is then mixed and kept thoroughly agitated by means of steam introduced to the tank through the steam-supply pipe, which extends some distance into the tank. The water-supply pipe to the tank and discharge-pipe from the tank are kept constantly open, and by the proper adjustment of the valve on the tank supply-pipe and auxiliary valves on the discharge-pipe the flow of the fluids is so regulated as to allow the solution to be drawn from the tank by the feed-pumps faster than the water is supplied to the tank. By taking the solution from the tank faster than the water is supplied to the tank the level of the solution will fall until the float-operated regulating-valve in the tank is closed and the supply of the solution to the boiler feed-pump shut off until the regulating-valve is again opened by the rising level of the solution, caused by the constant addition of water to the solution through the tank water-supply pipe, when the operation is again repeated. When from any cause the supply of water to the tank is shut off, as the level of the solution in the tank falls the float-valve will be closed and any possibility of air being admitted to the main supply-line to the feed-pump prevented. As required, additional soda-ash or other material is added to the mixing-tank, and in this manner the supply of neutralizing agent is constantly maintained. The volume of the solution being very small compared to the total volume of feed-water evaporated in the steam-boiler, the solution is not rendered too dilute by the constant additions of water to the mixing-tank.

By the use of the feeding apparatus a sufficient amount of the solution to neutralize the acids or other injurious materials in the boiler feed-water is supplied at regular intervals. By regulating the amount of solution supplied to the feed-water the feeding of an excess of the solution is prevented and the cost of supplying the neutralizing agents greatly reduced. The damage to the boiler which would be caused by an insufficient supply of the solution is prevented, and the possibility of draining the mixing-tank and liability of damage to the feed-pump which would result from such draining of the tank is avoided.

The regulating-valve in the tank may be placed outside the tank and be operated by suitable connections to the float in the tank, and other variations in the apparatus can be made without departing from our invention, since

What we claim is—

1. Apparatus for supplying a neutralizing solution to a steam-boiler, comprising a mixing-tank, a water-supply to the tank, means for regulating the water-supply to the tank, means for mixing the solution in the tank, a discharge-pipe from the tank to the boiler, and a float-regulated discharge-valve with a feed-pump and boiler; substantially as described.

2. Apparatus for supplying a neutralizing solution to a steam-boiler, comprising a mixing-tank, a water-supply to the tank, means for regulating the water-supply to the tank, means for mixing the solution in the tank, a discharge-pipe from the tank to the main boiler feed-line, and a float-regulated discharge-valve adapted to close automatically as the level in the tank falls; substantially as described.

In testimony whereof we have hereunto set our hands.

JOHN NOEY.
THOMAS A. McGUIGGAN.

Witnesses:
R. D. LITTLE,
GEO. B. BLEMING.